United States Patent [19]

Cornelius

[11] Patent Number: 5,405,245
[45] Date of Patent: Apr. 11, 1995

[54] CERAMIC BLADE ATTACHMENT SYSTEM

[75] Inventor: Charles C. Cornelius, San Diego, Calif.

[73] Assignee: Solar Turbines Incorporated, San Diego, Calif.

[21] Appl. No.: 158,583

[22] Filed: Nov. 29, 1993

[51] Int. Cl.6 .............................................. F01D 5/30
[52] U.S. Cl. .................................. 416/215; 416/241 B
[58] Field of Search ............. 416/215, 216, 217, 241 B

[56] References Cited

U.S. PATENT DOCUMENTS

| | | | |
|---|---|---|---|
| 2,821,357 | 1/1958 | Schorner | 416/241 B |
| 2,944,787 | 7/1960 | Gingras | 416/215 |
| 3,400,912 | 9/1968 | Carta et al. | 416/215 |
| 3,850,547 | 11/1974 | Canova et al. | 416/215 |
| 4,094,615 | 6/1978 | Glenn | 416/241 B |
| 4,111,603 | 9/1978 | Stahl | 416/241 B |
| 4,802,824 | 2/1989 | Gastebois et al. | 416/241 B |
| 5,031,400 | 7/1991 | Boyd | 416/241 B |
| 5,100,296 | 3/1992 | Partington | 416/217 |

FOREIGN PATENT DOCUMENTS 3110096  9/1982  Germany ........................ 416/241 B

*Primary Examiner*—Edward K. Look
*Assistant Examiner*—James A. Larson
*Attorney, Agent, or Firm*—Larry G. Cain

[57] ABSTRACT

A turbine blade having a preestablished rate of thermal expansion is attached to a turbine wheel having a preestablished rate of thermal expansion being greater than the preestablished rate of thermal expansion of the turbine blade. The turbine wheel includes a pair of side walls having a groove formed therebetween and a pair of axially aligned holes radially positioned therein. The turbine blade has a root portion having a bore positioned therein. A pin having a preestablished rate of thermal expansion being substantially equal to the rate of thermal expansion of the blade is positioned within the axially aligned holes and the bore attaches the blade to the turbine wheel.

7 Claims, 3 Drawing Sheets

CERAMIC BLADE ATTACHMENT SYSTEM

TECHNICAL FIELD

This invention relates generally to a gas turbine engine and more particularly to a turbine wheel assembly and the joint between a ceramic blade and a turbine wheel.

BACKGROUND ART

"The Government of the United States of America has rights in this invention pursuant to Contract No. DE-AC02-92CE40960 awarded by the U.S. Department of Energy."

In operation of a gas turbine engine, air at atmospheric pressure is initially compressed by a compressor and delivered to a combustion stage. In the combustion stage, heat is added to the air leaving the compressor by adding fuel to the air and burning it. The gas flow resulting from combustion of fuel in the combustion stage then expands through a turbine, delivering up some of its energy to drive the turbine and produce mechanical power.

In order to produce a driving torque, the axial turbine consists of one or more stages, each employing one row of stationary nozzle guide vanes and one row of moving blades mounted on a turbine disc. The nozzle guide vanes are aerodynamically designed to direct incoming gas from the combustion stage onto the turbine blades and thereby transfer kinetic energy to the blades.

The gases typically entering the turbine have an entry temperature from 850 degrees to at least 1200 degrees Fahrenheit. Since the efficiency and work output of the turbine engine are related to the entry temperature of the incoming gases, there is a trend in gas turbine engine technology to increase the gas temperature. A consequence of this is that the materials of which the blades and vanes are made assume ever-increasing importance with a view to resisting the effects of elevated temperature.

Historically, nozzle guide vanes and blades have been made of metals such as high temperature steels and, more recently, nickel alloys, and it has been found necessary to provide internal cooling passages in order to prevent melting. It has been found that ceramic coatings can enhance the heat resistance of nozzle guide vanes and blades. In specialized applications, nozzle guide vanes and blades are being made entirely of ceramic, thus, imparting resistance to even higher gas entry temperatures.

However, if the nozzle guide vanes and/or blades are made of ceramic, which have a different chemical composition, physical property and coefficient of thermal expansion to that of a metal supporting structure, then undesirable stresses, a portion of which are thermal stresses, will be set up between the nozzle guide vanes and/or blades and their supports when the engine is operating. Such undesirable thermal stresses cannot adequately be contained by cooling.

Furthermore, conventional joints between blades and discs have typically used a fir tree attachment, or root design. Historically a dovetail root design has been used with a ceramic blade in which a metallic compliant layer of material is used between the highly stressed ceramic blade root and the metallic turbine disc accommodating the relative movement, sliding friction, that occurs. The sliding friction between the ceramic blade and the metallic disc creates surface induced flaws such as a scratch or scratches in the ceramic that degrades the surface. This degradation in the surface of the ceramic occurs in a tensile stress zone of the blade root, therefore, when a surface flaw is generated in the ceramic of critical size, the blade root will fail catastrophically.

The present invention is directed to overcome one or more of the problems as set forth above.

DISCLOSURE OF THE INVENTION

In one aspect of the invention, a turbine assembly is comprised of a turbine wheel being made of a material having a preestablished rate of thermal expansion and having a groove therein. The groove is formed between a pair of end walls having a plurality of axially aligned holes positioned in each of the pair of end walls. The holes have an arcuate surface defined thereon. The turbine assembly is further comprised of a plurality of blades positioned in the annular groove. Each of the plurality of blades are made of a material having a preestablished rate of thermal expansion being less than the preestablished rate of thermal expansion of the turbine wheel. The blades have a root portion confined within the annular groove and the root portion has a bore therein. A generally cylindrical pin is made of a material having a preestablished rate of thermal expansion being substantially equal to the preestablished rate of thermal expansion of the plurality of blades is positioned in each of the bores and axially extends into the axially aligned holes.

BEST MODE FOR CARRYING OUT THE INVENTION

Figure 1:
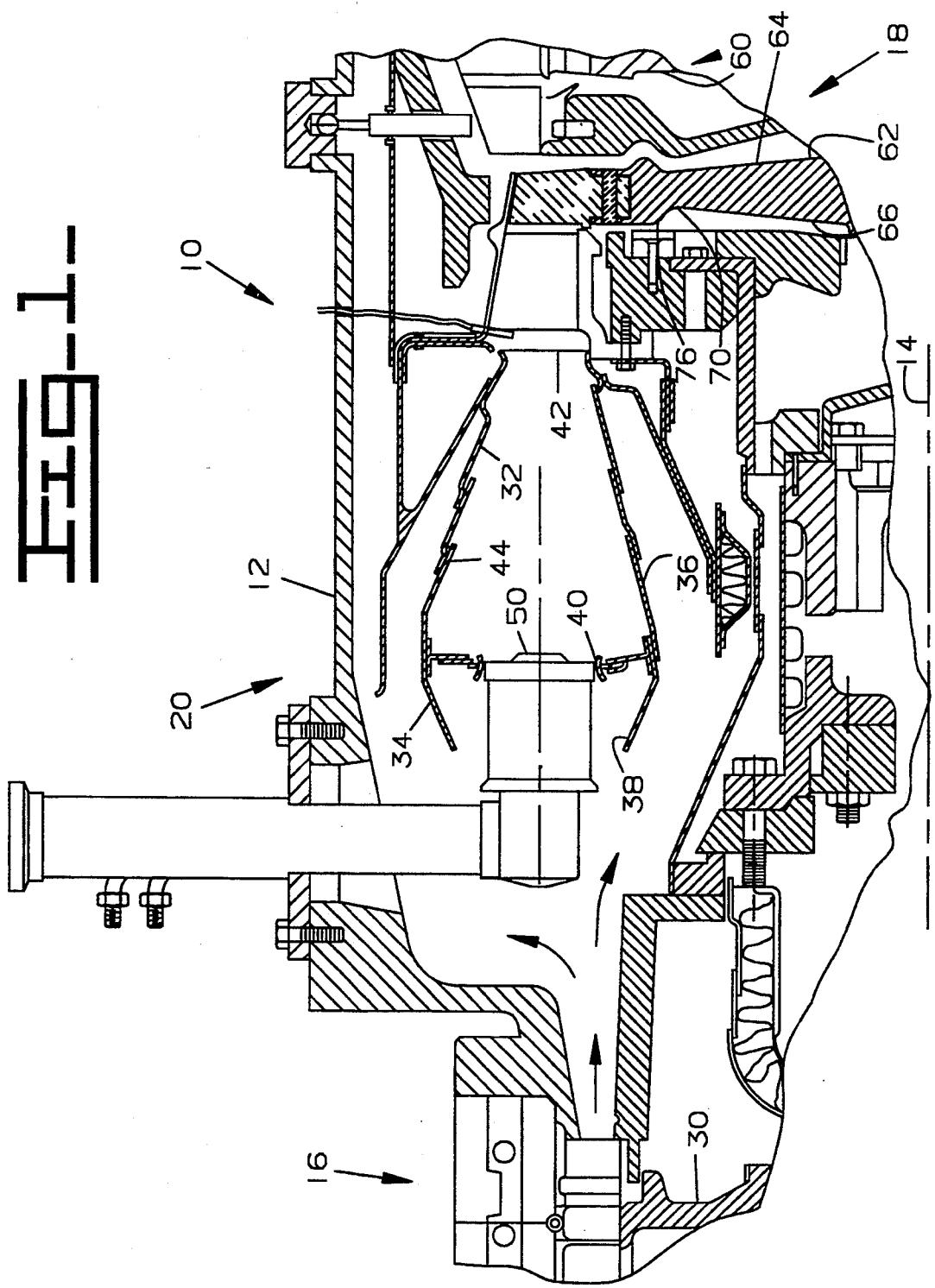
FIG. 1 is a partial side view of a gas turbine engine embodying the present invention with portions shown in section for illustration convenience.

Referring to FIG. 1, a gas turbine engine 10 is shown. The gas turbine engine 10 has an outer housing 12 having a central axis 14. Positioned in the housing 12 and centered about the axis 14 is a compressor section 16, a turbine section 18 and a combustor section 20 positioned operatively between the compressor section 16 and the turbine section 18.

When the engine 10 is in operation, the compressor section 16, which in this application includes an axial staged compressor 30 or, as an alternative, a radial compressor or any source for producing compressed air, causes a flow of compressed air which has at least a part thereof communicated to the combustor section 20. The combustor section 20, in this application, includes an annular combustor 32. The combustor 32 has a generally cylindrical outer shell 34 being coaxially positioned about the central axis 14, a generally cylindrical inner shell 36, an inlet end 38 having a plurality of generally evenly spaced openings 40 therein and an outlet end 42. In this application, the combustor 32 is constructed of a plurality of generally conical segments 44. Each of the openings 40 has an injector 50 positioned therein. As an alternative to the annular combustor 32, a plurality of can type combustors could be incorporated without changing the essence of the invention.

The turbine section 18 includes a power turbine 60 having an output shaft, not shown, connected thereto for driving an accessory component such as a generator. Another portion of the turbine section 18 includes a gas producer turbine 62 connected in driving relationship to the compressor section 16. The gas producer turbine 62 includes a turbine assembly 64 being rotationally positioned about the central axis 14. The turbine assembly 64 includes a disc 66 being formed within an outer extremity 70. Attached to the outer extremity 70 of the disc 66 is a flange 76, best shown in FIGS. 2 and 3, having an outer portion 78 defining therein an annular groove 80 of a generally "U" shaped configuration. The annular groove 80 radially extends inwardly from the circumference of the outer portion 78 a preestablished distance. The flange 76 has a generally forked cross-section formed by a pair of end walls 82. The annular groove 80 is generally centered between the pair of end walls 82. The flange has a preestablished rate of thermal expansion. As an alternative, the groove could be formed by intermittent cuts about the circumference of the outer portion 78 rather than being an annular groove. The pair of end walls 82 each include an outer surface 84 and an inner surface 86. The inner surfaces 86 correspond to the side surfaces of the annular groove 80. The annular groove 80 further includes a bottom surface 88 being spaced from the central axis 14 by a preestablished radius. The outer surface 84 of each end wall 82 defines a preestablished width of the flange 76 and the inner surfaces 86 define a preestablished width of the annular groove 80. The flange 76, in this application, is made of an alloy steel and the disc 66 and the flange 76 form a turbine wheel 90. A plurality of axially aligned holes 92 are radially positioned in each of the pair of end walls 82 intermediate the circumference of the outer portion 78 and the bottom surface 88 of the annular groove 80. The holes 92 have a preestablished diameter forming an inner arcuate surface 94 having a preestablished surface finish therein.

Figure 2:
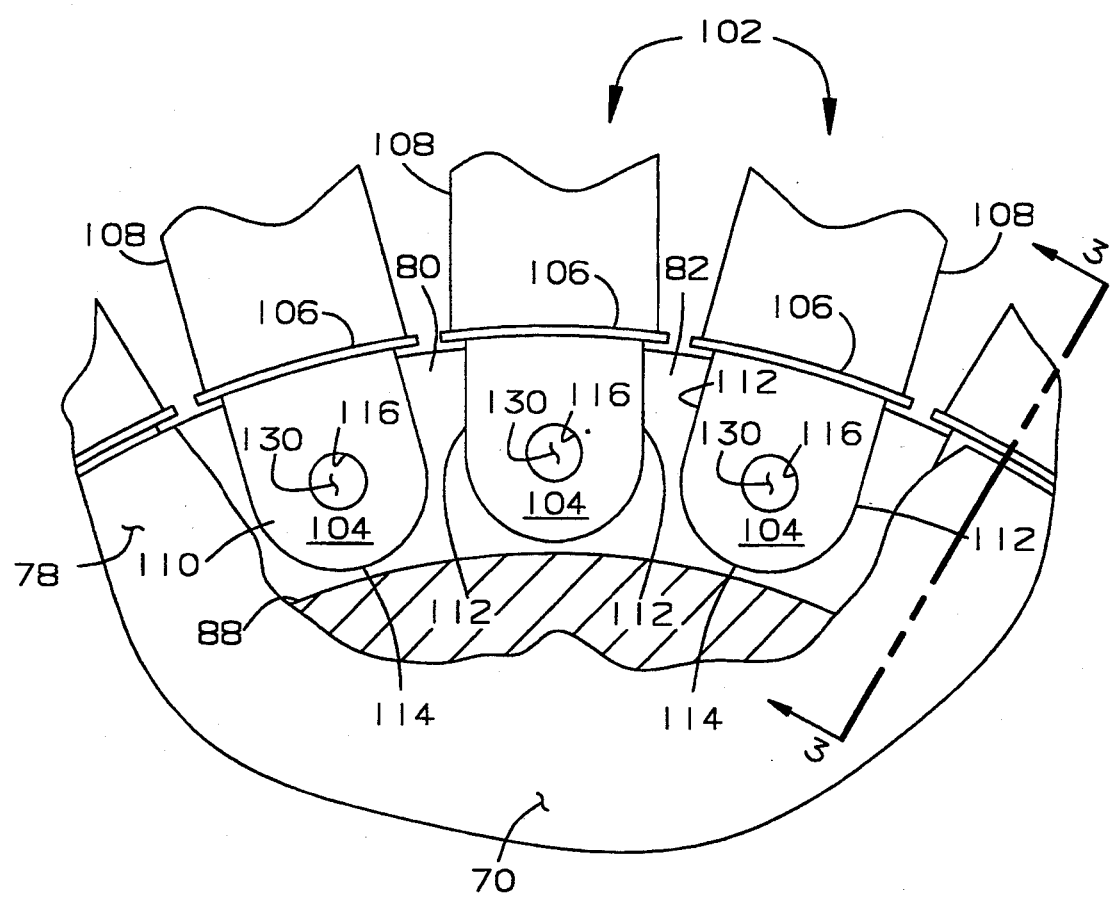
FIG. 2 is an enlarged sectional view of a joint between a ceramic blade and a disc taken along line 2—2 of FIG. 1.
Figure 3:
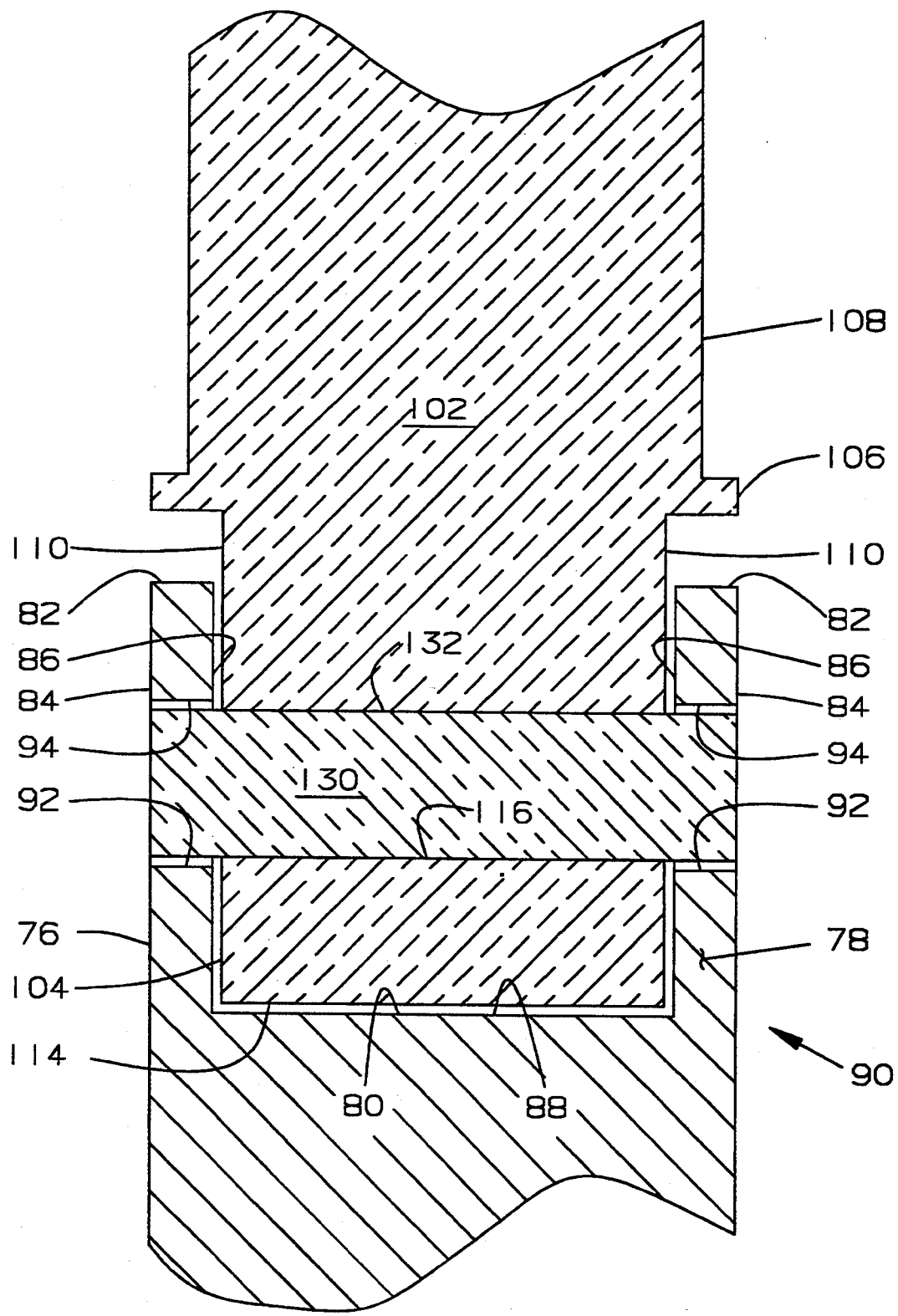
FIG. 3 is and enlarged sectional view of a joint between a ceramic blade and a disc taken along line 3—3 of FIG. 2.

As best shown in FIGS. 2 and 3, a plurality of blades 102 are positioned within the annular groove 80. Each of the plurality of blades 102 includes a root portion 104 confined within the annular groove 80, a base portion 106 extending radially from the root portion 104 and a blade portion 108 radially extending from the base portion 106. The blade 102, in this application, is made of a ceramic material, such as silicon carbide or silicon nitride, and has a preestablished rate of thermal expansion which is less than the preestablished rate of thermal expansion of the flange 76. The root portion 104 includes a pair of end surfaces 110 and a pair of side surfaces 112 extending from the base portion 106 and a base 114 extending between the end surfaces 110 and the side surfaces 112. The base 114 has a generally arcuate configuration extending between the end surfaces 110 and the side surfaces 112, and is spaced from the bottom surface 88 of the annular groove 80 a preestablished distance. As an alternative, the base 114 could be flat or arced in the other direction. The side surfaces 110 are positioned adjacent the inner surfaces 86 of the annular groove 80 and the pair of end walls 82 and are spaced therefrom a preestablished distance. Each of the blades 102 include a bore 116 positioned in the root portion 104. The bore 116 extends axially between the side surfaces 110 and is axially aligned with the holes 92 in the pair of end walls 82. The bore 116 is radially positioned outwardly of the inner surface 114 and has a preestablished diameter.

A generally cylindrical pin 130 axially extends through each of the holes 92 in the pair of end walls 82 and the corresponding axially aligned bore 116 in the root portion 104 of each blade 102. The cylindrical pin 130 retains each of the blades 102 within the turbine wheel 90. In this application, the cylindrical pin 130 is made of a ceramic material, such as silicon nitride or silicon carbide, having a preestablished rate of thermal expansion being substantially equal to the rate of thermal expansion of the blade 102. The cylindrical pin 130 includes a preestablished diameter being slightly larger than the preestablished diameter of the bore 116 so that the pin 130 and the blade 102 are attached with a light press fit. The cylindrical pin 130 also includes an outer surface 132 having a preestablished surface finish. The cylindrical pin 130 has a length generally equal to the width defined by the outer surfaces 84 of the pair of end walls 82. The interface between the outer surface 132 of the cylindrical pin 130 and the inner surface 94 of the holes 92 is loose, approximately 0.1 mm to 0.2 mm, to a line to line fit. As an alternative, the interface between the cylindrical pin 130 and the blade 102 could be a loose, approximately 0.1 mm to 0.2 mm, to a line to line fit and the interface between the outer surface 132 of the cylindrical pin 130 and the inner surface 94 of the holes 92 could be a press or an interference fit. As a further alternative, the cylindrical pin 130 could be retained axially within the pair of end walls 82 by an external means, such as a pair of plates, not shown, attached to the outer surface 86 of the pair of end walls 82 to prevent axial movement of the cylindrical pin 130.

INDUSTRIAL APPLICABILITY

In use, the gas turbine engine 10 is started and allowed to warm up and is in any suitable power application. As the demand for load or power is increased, the load on the engine 10 output is increased by increasing the fuel resulting in the temperature within the engine 10 increasing. The components used to make up the turbine assembly 64, being of different materials and different rates of thermal expansion, grow at different rates and the forces resulting therefrom and acting thereon must be structurally compensated for to increase life and efficiency of the gas turbine engine 10. For example, as the turbine assembly 64 rotates, centrifugal forces cause the individual blades 102 to exert an outward force on the cylindrical pin 130 and on the flange 76. Since the outer surface 132 of the cylindrical pin 130 and the bore 116 within the blade 102 are attached by a press fit therebetween and have a thermal rate of expansion being generally equal, relative movement therebetween is minimal at the most and the blade 102 and the cylindrical pin 130 acts as a single unit. Thus, the sliding friction in the tensile stressed region of the blade root portion 104 is reduced to a minimum or eliminated. Furthermore, since the outer surface 132 of the cylindrical pin 130 and the inner surface 94 of the holes 92 are loose to a line to line fit, the outer surface 132 of the cylindrical pin 130 and the inner surface 94 of the holes 92 are free to pivot relative to each other. Contact between the base portion 106 and the circumference of the outer portion 78 restricts the pivoting motion of the blade 102. Thus, the interface between the inner surface 94 and the outer surface 132 act as bearing surfaces reducing or eliminating scrubbing and increasing life. The interface is in rolling contact. The load is reacted between the cylindrical pin 130 and the flange 76 placing the surfaces 94, 132 in a highly compressive load which does not allow a surface induced flaw to propagate and cause catastrophic failure. As the flange 76, which is made of a steel material, expands due to an increase in temperature, the functionality of the rolling contact is further utilized. For example, the relative geometry of the hole 92 will grow to a greater degree relative to the geometry of the cylindrical pin 130 which is made of a ceramic material. Thus, the loose fit becomes tighter, but not to the extent of being a press fit, and the pivoting function remains.

In view of the foregoing, it is readily apparent that the structure of the present invention provides an improved joint between the ceramic blade 102 or a component having a preestablished rate of thermal growth which is low and the turbine wheel 90 or a component having a preestablished rate of thermal growth which is much higher than the ceramic material. The structural arrangement of the outer surface 132 of the cylindrical pin 130 and the bore 116 within the blade 102 have a thermal rate of expansion which is generally equal and relative movement therebetween is minimal. The blade 102 and the cylindrical pin 130 act as a single unit. Thus, the sliding friction in the tensile stressed region of the blade root portion 104 is reduced to a minimum or eliminated. The structural arrangement of the outer surface 132 of the cylindrical pin 130 and mating or meshing inner surface 94 of the holes 92 provides a generally rolling joint which reduces or eliminates surface induced flaws; furthermore, placing the surfaces 94, 132 in a highly compressive load which does not allow a surface induced flaw to propagate and cause catastrophic failure of the ceramic components.

Other aspects, objects and advantages of this invention can be obtained from a study of the drawings, the disclosure and the appended claims.

I claim:

1. A turbine assembly comprising:
   a turbine wheel being made of a material having a preestablished rate of thermal expansion and having an annular groove therein, said groove being formed between a pair of walls having a plurality of axially aligned holes defining an arcuate surface being radially positioned in each of the pair of walls;
   a plurality of blades positioned in the annular groove, each of said plurality of blades being made of a material having a preestablished rate of thermal expansion being less than the preestablished rate of thermal expansion of the turbine wheel, having a root portion confined within the annular groove, said root portion having a bore therein; and
   a generally cylindrical pin being made of a material having a preestablished rate of thermal expansion being substantially equal to the preestablished rate of thermal expansion of the plurality of blades, being positioned in each of the bores and axially extending into the axially aligned holes.

2. The turbine assembly of claim 1 wherein said bore of the blade defines an inner arcuate surface and said pin having an outer arcuate surface defined thereon, said outer arcuate surface of the cylindrical pin and said inner arcuate surface of the bore define an interface therebetween.

3. The turbine assembly of claim 2 wherein said interface between the outer arcuate surface and said inner arcuate surface is a press fit.

4. The turbine assembly of claim 2 wherein said interface between the outer arcuate surface and said inner arcuate surface is a line to line fit.

5. The turbine assembly of claim 2 wherein said plurality of axially aligned holes define an arcuate surface thereon, and said outer arcuate surface of the cylindrical pin and said arcuate surface of the plurality of axially aligned holes define an interface therebetween.

6. The turbine assembly of claim 5 wherein said interface between said outer arcuate surface of the cylindrical pin and said arcuate surface of the plurality of axially aligned holes is a press fit.

7. The turbine assembly of claim 5 wherein said interface between said outer arcuate surface of the cylindrical pin and said arcuate surface of the plurality of axially aligned holes is a loose fit.

* * * * *